(12) United States Patent
Pularikkal et al.

(10) Patent No.: US 10,785,195 B2
(45) Date of Patent: Sep. 22, 2020

(54) MOBILE COMMUNICATIONS OVER SECURE ENTERPRISE NETWORKS

(71) Applicant: Cisco Technology, Inc., San Jose, CA (US)

(72) Inventors: Gangadharan Byju Pularikkal, San Jose, CA (US); Santosh Ramrao Patil, Santa Clara, CA (US); Mark Grayson, Berkshirem (GB); Madhusudan Nanjanagud, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 206 days.

(21) Appl. No.: 15/854,181

(22) Filed: Dec. 26, 2017

(65) Prior Publication Data

US 2019/0036888 A1   Jan. 31, 2019

Related U.S. Application Data

(60) Provisional application No. 62/539,463, filed on Jul. 31, 2017.

(51) Int. Cl.
*H04L 29/06*   (2006.01)
*H04W 12/04*   (2009.01)
(Continued)

(52) U.S. Cl.
CPC ...... *H04L 63/0428* (2013.01); *H04L 63/0236* (2013.01); *H04L 63/0435* (2013.01);
(Continued)

(58) Field of Classification Search
CPC . H04L 65/80; H04L 65/1069; H04L 63/1416; H04L 63/1408; H04L 63/0272;
(Continued)

(56) References Cited

U.S. PATENT DOCUMENTS 8,973,088 B1 * 3/2015 Leung .................... H04L 63/00
726/1
9,642,167 B1 * 5/2017 Snyder ................ H04W 4/021
(Continued)

OTHER PUBLICATIONS

"Real Time Communication", Volte, RCS, IMS, SIP, WebTRC, IoT/M2M and all the stuff around, Apr. 6, 2016, pp. 1-9.
(Continued)

*Primary Examiner* — Tae K Kim

(57) ABSTRACT

In various implementations, a method includes receiving a request to establish an end-to-end encrypted session between a device in an enterprise network and an external entity that is outside the enterprise network. In some implementations, the end-to-end encrypted session allows encrypted packets to be transmitted between the device and the external entity. In various implementations, the method includes determining whether the request satisfies an enterprise security criterion for establishing the end-to-end encryption session. In various implementations, the method includes in response to determining that the request satisfies the enterprise security criterion, triggering the establishment of the end-to-end encrypted session between the device in the enterprise network and the external entity that is outside the enterprise entity.

20 Claims, 9 Drawing Sheets

(51) Int. Cl.
*H04W 12/08* (2009.01)
*H04W 12/00* (2009.01)
*H04W 12/02* (2009.01)
*H04W 84/12* (2009.01)

(52) U.S. Cl.
CPC ...... *H04L 63/0876* (2013.01); *H04L 63/1425* (2013.01); *H04W 12/001* (2019.01); *H04W 12/04* (2013.01); *H04W 12/08* (2013.01); H04L 63/10 (2013.01); *H04L 63/101* (2013.01); *H04W 12/00512* (2019.01); *H04W 12/02* (2013.01); *H04W 84/12* (2013.01)

(58) Field of Classification Search
CPC ............. H04L 63/0435; H04L 63/0442; H04L 63/045; H04L 63/0428; H04L 63/1425; H04L 63/1441; H04L 63/20; H04L 63/1433; H04L 63/145; H04L 63/0236; H04L 9/32; H04L 9/321; H04L 41/0803; H04L 41/0806; H04L 41/0816; H04L 41/0853; H04L 41/147
See application file for complete search history.

(56) References Cited

U.S. PATENT DOCUMENTS

| | | | | |
|---|---|---|---|---|
| 10,341,300 | B2* | 7/2019 | Grayson | H04L 63/1425 |
| 2011/0222688 | A1* | 9/2011 | Graham | H04W 12/0013 |
| | | | | 380/247 |
| 2011/0271320 | A1* | 11/2011 | Andreasen | H04L 63/164 |
| | | | | 726/1 |
| 2012/0246212 | A1* | 9/2012 | Ahmad | H04L 65/80 |
| | | | | 709/201 |
| 2013/0091526 | A1* | 4/2013 | Iyer | H04N 21/6437 |
| | | | | 725/62 |
| 2013/0103939 | A1* | 4/2013 | Radpour | H04W 12/04 |
| | | | | 713/152 |
| 2015/0163811 | A1* | 6/2015 | Konstantinou | H04W 76/16 |
| | | | | 370/329 |
| 2016/0255050 | A1* | 9/2016 | Grayson | H04L 63/1408 |
| | | | | 726/1 |
| 2016/0366155 | A1* | 12/2016 | El-Moussa | H04L 63/145 |
| 2016/0373944 | A1* | 12/2016 | Jain | H04W 24/02 |
| 2017/0005914 | A1* | 1/2017 | Edge | H04L 61/1511 |
| 2017/0013000 | A1* | 1/2017 | El-Moussa | H04L 63/1408 |
| 2017/0135031 | A1* | 5/2017 | Buckley | H04W 48/18 |
| 2017/0164195 | A1* | 6/2017 | Stammers | H04W 12/08 |
| 2017/0272330 | A1* | 9/2017 | Cao | H04B 7/14 |
| 2018/0027478 | A1* | 1/2018 | Sama | H04W 28/0226 |
| | | | | 370/331 |
| 2018/0152974 | A1* | 5/2018 | Chitrapu | H04W 76/12 |
| 2018/0184340 | A1* | 6/2018 | Pularikkal | H04W 12/06 |
| 2018/0199394 | A1* | 7/2018 | Teyeb | H04L 12/4633 |
| 2018/0213472 | A1* | 7/2018 | Ishii | H04W 4/00 |
| 2019/0052603 | A1* | 2/2019 | Wu | H04W 12/06 |

OTHER PUBLICATIONS

"VoWifi, A New Innovation in Telecom Sector May Change the Way of Voice Calls", Universal Media Consultants, 2017, pp. 1-5.
"Wifi-Calling", White Paper, Aruba, A Hewlett Packard Enterprise Company, 2015, pp. 1-8.

* cited by examiner

MOBILE COMMUNICATIONS OVER SECURE ENTERPRISE NETWORKS

PRIORITY CLAIM

This application claims priority to U.S. provisional patent application No. 62/539,463 filed on Jul. 31, 2017, the contents of which are hereby incorporated by reference.

TECHNICAL FIELD

The present disclosure relates generally to secure enterprise networks, and in particular, to mobile communications over secure enterprise networks.

BACKGROUND

Various cellular network operators allow cellular devices to communicate over non-cellular wireless networks such as Wi-Fi networks. For example, some cellular network operators allow cellular devices to make and/or receive phone calls over Wi-Fi networks. Some cellular network operators allow cellular devices to send and/or receive messages over Wi-Fi networks. As such, some cellular devices are able to utilize cellular services over non-cellular wireless networks, for example, when the cellular devices have limited access to cellular networks. Since data traffic associated with telecommunications such as cellular mobile communications is often encrypted, some secure enterprise networks do not allow cellular devices to make and/or receive phone calls over the secure enterprise networks.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
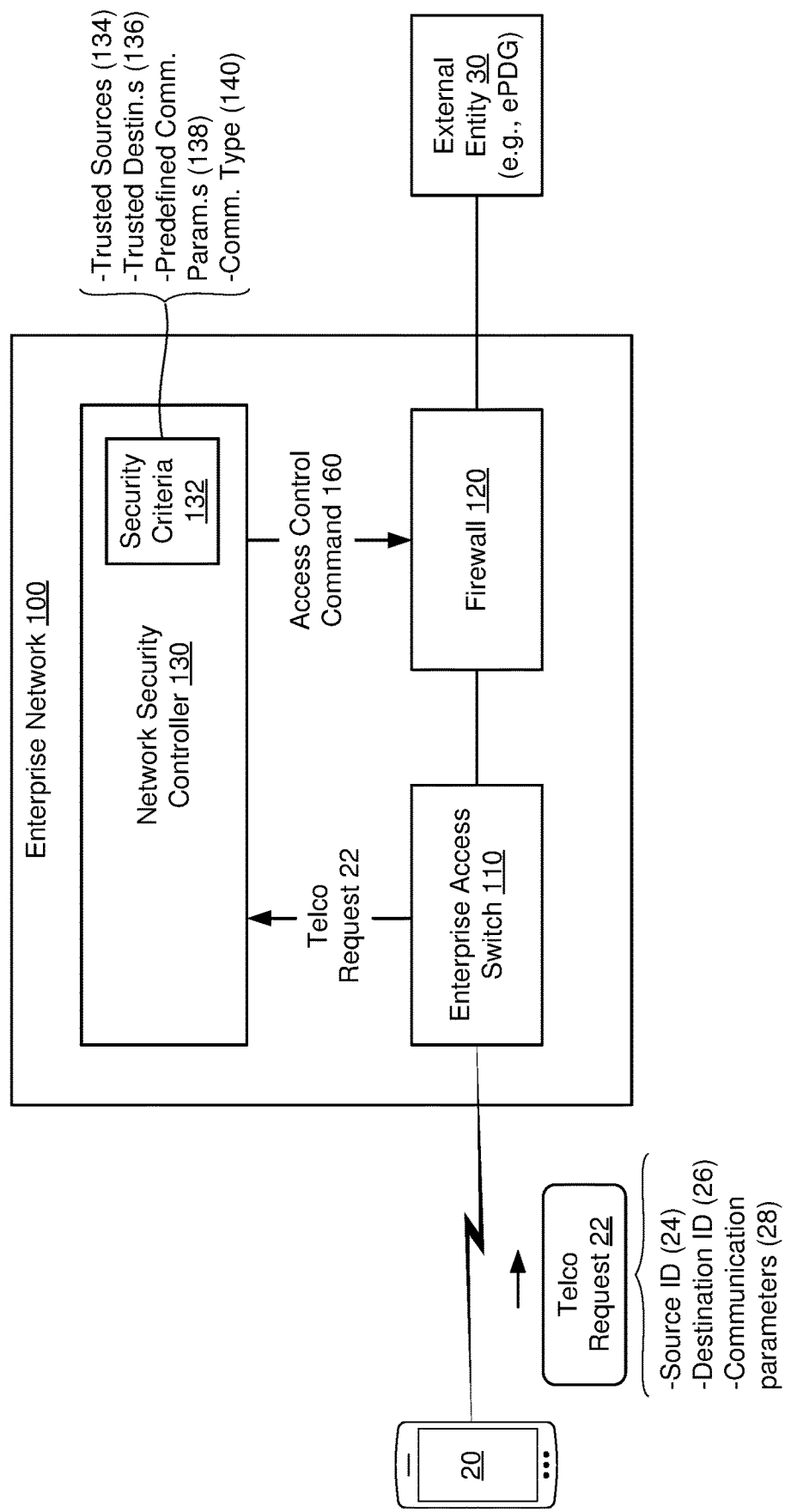
FIG. 1A is a schematic diagram of a secure enterprise network environment that allows calling/messaging over secure enterprise networks in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein enable telecommunication over secure enterprise networks. For example, in various implementations, a method of establishing an end-to-end encrypted session is performed by a network node within an enterprise network. In some implementations, the network node includes a non-transitory memory and one or more processors coupled with the non-transitory memory. In some implementations, the method includes obtaining a request to establish an end-to-end encrypted session between a device in the enterprise network and an external entity that is outside the enterprise network. In some implementations, the end-to-end encrypted session allows encrypted packets to be transmitted between the device and the external entity. In some implementations, the method includes determining whether the request satisfies an enterprise security criterion for establishing the end-to-end encryption session. In some implementations, the method includes establishing the end-to-end encrypted session between the device and the external entity based on the request satisfying the enterprise security criterion.

Example Embodiments

Some cellular service providers (e.g., carriers) allow their cellular subscribers to make phone calls over a non-cellular wireless network such as a Wireless Fidelity (Wi-Fi) network. Phone calls made over a Wi-Fi network are generally referred to as Wi-Fi calls. Some Wi-Fi calls utilize encrypted tunnels between devices that are within a secure enterprise network and cellular network nodes that are outside the secure enterprise network. The encrypted tunnels often operate according to the Internet Protocol Security (IPSec) standard. Since encrypted tunnels provide end-to-end encryption, the secure enterprise networks are unable to ascertain the type and/or the content of the traffic being transported over the encrypted tunnels. As such, in order to reduce potential security breaches, many secure enterprise networks block encrypted tunnels, in particular IPSec tunnels, to external entities that are outside the secure enterprise network. Consequently, even though many cellular service providers allow carrier Wi-Fi calling, many devices are unable to make Wi-Fi calls over secure enterprise networks.

The present disclosure provides methods, systems and/or devices for a secure enterprise network to allow Wi-Fi calling while maintaining the integrity of the secure enterprise network. In some implementations, the secure enterprise network enables Wi-Fi calling by selectively allowing encrypted tunnels for a particular type of traffic that corresponds with Wi-Fi calling while denying encrypted tunnels for types of traffic that correspond with other functions such as file transfer. In some implementations, the secure enterprise network maintains its integrity by allowing the establishment of encrypted tunnels with known external entities and denying the establishment of encrypted tunnels with unknown external entities thereby reducing the likelihood of establishing encrypted tunnels with malicious entities. In some implementations, the secure enterprise network monitors the traffic flow for an ongoing Wi-Fi call to ensure that the traffic flow corresponds to a Wi-Fi call and not some other function such as file transfer. More generally, in various implementations, the present disclosure provides a secure enterprise network that allows Wi-Fi calling while satisfying a security criterion associated with the secure enterprise network.

FIG. 1A is a schematic diagram of a network environment 10 that selectively allows carrier Wi-Fi calling/messaging. While certain specific features are illustrated, those of ordinary skill in the art will appreciate from the present disclosure that various other features have not been illustrated for the sake of brevity and so as not to obscure more pertinent aspects of the example implementations disclosed herein. To that end, the network environment 10 includes a mobile device 20, a secure enterprise network 100 ("enterprise network 100", hereinafter for the sake of brevity), and an external entity 30 that is outside the enterprise network 100.

In various implementations, the mobile device 20 includes a cellular communication device, the external entity 30 is part of a cellular network that provides carrier Wi-Fi calling/messaging, and the enterprise network 100 selectively allows Wi-Fi calls/messages. In various implementations, the external entity 30 includes a cellular network node. For example, in some implementations, the external entity 30 includes an Evolved Packet Data Gateway (ePDG).

In various implementations, the enterprise network 100 includes an enterprise access switch 110, a firewall 120 and a network security controller 130. In some implementations, the enterprise access switch 110 allows the mobile device 20 to access the enterprise network 100. In some implementations, the enterprise access switch 110 includes a wireless access point (AP). In some implementations, the network security controller 130 establishes, monitors and/or maintains security criteria 132 associated with the enterprise network 100. In some implementations, the security criteria 132 define a set of trusted sources 134, a set of trusted destinations 136 and/or a set of predefined communication parameters 138 for Wi-Fi calls/messages. In some implementations, the security criteria 132 defines a set of communication types 140 that are permitted between mobile devices and external entities over an end-to-end encrypted communication channel. In some implementations, the trusted sources 134 indicate mobile devices that are permitted to make/receive Wi-Fi calls/messages (e.g., mobile devices that have been whitelisted). In some implementations, the trusted destinations 136 indicate external entities with which mobile devices inside the enterprise network 100 are permitted to communicate via Wi-Fi calls/messages (e.g., Fully Qualified Domain Names (FQDNs) that have been whitelisted). In some implementations, the predefined communication parameters 138 indicate permitted communication parameters (e.g., permitted encryption algorithms). In some implementations, the communication types 140 include Wi-Fi calls (e.g., Wi-Fi audio only calls and/or Wi-Fi video calls), and/or Wi-Fi messages (e.g., Short Message Service (SMS) messages, Multimedia Message Service (MMS) messages, and/or messages sent/received via an instant messaging application and/or a social messaging application installed on mobile devices). In some implementations, the security criteria 132 define security policies, and the network security controller 130 ensures that the mobile device 20 operates in accordance with the security policies. More generally, in various implementations, the network security controller 130 controls the flow of traffic into and/or out of the wireless network 100 via the firewall 120.

In various implementations, the enterprise network 100 receives a telecommunication request 22 ("request 22", hereinafter for the sake of brevity) from the mobile device 20. In some implementations, the request 22 includes a request to initiate/receive a Wi-Fi call/message. In some implementations, the request 22 includes a source identifier (ID) 24, a destination ID 26 and/or communication parameters 28. In some implementations, the source ID 24 identifies a source of the request 22 (e.g., the mobile device 20). For example, in some implementations, the source ID 24 includes an address of the mobile device 20 (e.g., an IP address, a MAC address, etc.). In some implementations, the destination ID 26 identifies a destination associated with the request 22. For example, in some implementations, the destination ID 26 includes an address of the external entity 30. In some implementations, the destination ID 26 includes a Fully Qualified Domain Name (FQDN) associated with an ePDG. In some implementations, the communication parameters 28 indicate a type of communication that is being requested. For example, in some implementations, the communication parameters 28 indicate that the mobile device 20 is requesting to make/receive a Wi-Fi call. In some implementations, the communication parameters 28 indicate a type of encryption associated with the requested communication. For example, in some implementations, the communication parameters 28 indicate whether the requested Wi-Fi call will be encrypted and, if so, the type of encryption algorithm that will be used.

In various implementations, the network security controller 130 determines whether or not to grant the request 22 based on a combination of the source ID 24, the destination ID 26 and the communication parameters 28. In some implementations, the network security controller 130 grants the request 22 in response to the request 22 satisfying the security criteria 132. For example, in some implementations, the network security controller 130 grants the request 22 in response to the source ID 24 being among the trusted sources 134. In some implementations, the network security controller 130 grants the request 22 in response to the destination ID 26 being among the trusted destinations 136. In some implementations, the network security controller 130 grants the request 22 in response to the communication parameters 28 being the same as or within a threshold of the predefined communication parameters 138. In some implementations, the network security controller 130 grants the request 22 in response to a type of communication requested being within the set of communication types 140 defined by the security criteria. In some implementations, the network security controller 130 denies the request 22 in response to the request 22 failing the security criteria 132 (e.g., in response to the request 22 breaching (e.g., not satisfying) the security criteria 132).

In some implementations, the network security controller 130 generates an access control command 160 for the firewall 120. In some implementations, the access control command 160 instructs the firewall 120 to allow end-to-end encrypted flow of data between the mobile device 20 and the external entity 30 (e.g., in response to the request 22 satisfying the security criteria 132). In some implementations, the firewall 120 maintains an access control list, and the access control command 160 instructs the firewall 120 to add the mobile device 20 and/or the external entity 30 to the access control list so that the end-to-end encrypted traffic can flow between the mobile device 20 and the external entity 30. In some implementations, the access control command 160 instructs the firewall 120 to deny end-to-end encrypted flow of data between the mobile device 20 and the external entity 30 (e.g., in response to the request 22 failing (e.g., not satisfying) the security criteria 132).

In some implementations, the network security controller 130 does not allow mobile devices with known security vulnerabilities to establish end-to-end encrypted communication sessions in order to prevent malicious entities from exploiting the security vulnerabilities. For example, in some implementations, the network security controller 130 obtains a list of known security vulnerabilities for various device types, and determines whether the mobile device 20 is of one of the device types with known security vulnerabilities. In some implementations, the network security controller 130 denies the request 22 in response to the mobile device 20 being of a device type that has known security vulnerabilities. In some implementations, the device type of the mobile device 20 refers to a make of the mobile device 20, a model of the mobile device 20, an operating system (OS) version of the mobile device 20, a firmware version of the mobile device 20, and/or a patch installed at the mobile device 20. In some implementations, some device types with certain known security vulnerabilities are blacklisted. As such, in some implementations, if a device type of the mobile device 20 is blacklisted, the network security controller 130 denies the request 22.

In some implementations, the network security controller 130 allows Wi-Fi calls (e.g., IPSec calls) to external entities (e.g., security gateways) that are associated with FQDNs which are trusted (e.g., approved, for example, white listed). In some implementations, the network security controller 130 updates the list of whitelisted FQDNs based on an enterprise policy to allow or deny calls corresponding to specific mobile operators. In some implementations, after the network security controller 130 determines that the mobile device 20 is of a device type that is permitted to make/receive Wi-Fi calls, the network security controller 130 monitors DNS queries from the mobile device 20. In some implementations, the network security controller 130 determines whether the mobile device 20 makes a DNS query for an FQDN which is in an approved list of FQDNs. In some implementations, the list of approved FQDNs includes known ePDG FQDN name formats that are used by carriers. In some implementations, the list of approved FQDNs includes a wild card entry which matches multiple FQDNs corresponding to various carriers. In some implementations, the wild card entry complies with 3rd Generation Partnership Project (3GPP) FQDN formats. In some implementations, the set of trusted destinations 136 includes the list of approved/whitelisted FQDNs.

In various implementations, the network security controller 130 determines whether one or more encryption parameters associated with the request 22 are valid. In various implementations, the network security controller 130 utilizes a collection (e.g., a datastore or a library) of IPSec vulnerability signatures to determine the validity of the encryption parameter(s) associated with the request 22. In some implementations, the network security controller 130 updates the collection of IPSec vulnerability signatures on an ongoing basis. In some implementations, the network security controller 130 determines whether the request 22 indicates a repetitive use of Diffi-Helman values. In some implementations, the network security controller 130 determines whether the request 22 indicates weak encryption cypher-suites. For example, the network security controller 130 determines whether the request 22 indicates IPSec transforms that are typically used by carrier implementations. In some implementations, the network security controller 130 analyzes the request 22 for any known security vulnerabilities. In various implementations, the network security controller 130 analyzes IPSec metadata to determine whether or not to grant the request 22. In some implementations, the IPSec metadata includes one or more of initial cryptographic algorithms, selected cryptographic algorithms, Diffi-Helman group and/or certificate related data.

Figure 1B:
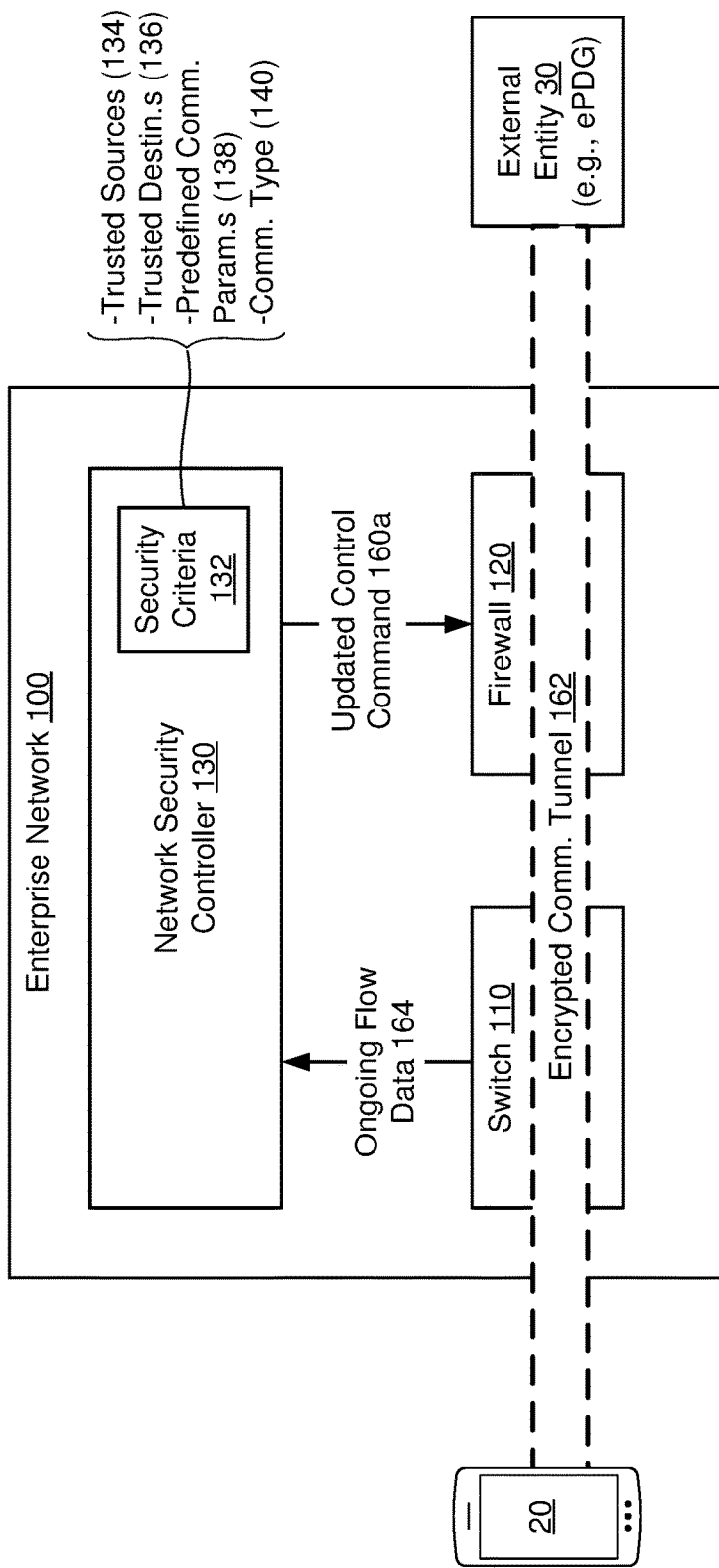
FIG. 1B is another schematic diagram of the secure enterprise network environment in accordance with some implementations.

FIG. 1B illustrates another schematic diagram of the network environment 10 in accordance with some implementations. In various implementations, the enterprise network 100 (e.g., the network security controller 130) establishes an encrypted communication tunnel 162 between the mobile device 20 and the external entity 30. For example, in some implementations, the firewall 120 allows the establishment of the encrypted communication tunnel 162 in response to receiving the access control command 160 shown in FIG. 1. In some implementations, the encrypted communication tunnel 162 corresponds to an IPSec session that allows end-to-end encryption between the mobile device 20 and the external entity 30. More generally, in various implementations, packets transported by the encrypted communication tunnel 162 are encrypted such that the enterprise network 100 is not able to discern the content carried by the packets.

In various implementations, the network security controller 130 monitors the encrypted communication tunnel 162 to determine whether the encrypted communication tunnel 162 satisfies the security criteria 132. In some implementations, the network security controller 130 determines whether the encrypted communication tunnel 162 satisfies the security criteria 132 based on ongoing flow data 164 that indicates characteristics of packets transported over the encrypted communication tunnel 162. For example, in some implementations, the network security controller 130 determines whether packets transported over the encrypted communication tunnel 162 are of the communication type 140 defined by the security criteria 132. In some implementations, the network security controller 130 determines whether packets being sent/received over the encrypted communication tunnel 162 are being sent to/received from external entities that are among the trusted destinations 136. In some implementations, the network security controller 130 determines whether the encrypted communication tunnel 162 is operating in accordance with the predefined communication parameters 138 (e.g., whether the encrypted communication tunnel 162 is using encryption algorithms specified in the predefined communication parameters 138). In some implementations, the network security controller 130 sends an updated control command 160a to the firewall 120. In some implementations, the updated control command 160a instructs the firewall 120 to block traffic over the encrypted communication tunnel 162 (e.g., in response to determining that the ongoing flow data 164 breaches (e.g., does not satisfy) the security criteria 132).

In various implementations, the network security controller 130 performs ongoing monitoring of active encrypted communication tunnels (e.g., active IPSec sessions) such as the encrypted communication tunnel 162 to determine whether the active encrypted communication tunnels satisfy the security criteria 132. In some implementations, the network security controller 130 terminates encrypted communication tunnels that breach (e.g., do not satisfy) the security criteria 132. In some implementations, the network security controller 130 allows encrypted communication tunnels to continue operating as long as the encrypted communication tunnels satisfy the security criteria 132. In some implementations, the network security controller 130 performs ongoing monitoring of active encrypted communication tunnels (e.g., active IPSec sessions) by analyzing network flow data (e.g., data flowing through the enterprise network 100), intra flow data (e.g., the ongoing flow data 164) and/or metadata (e.g., IPSec metadata such as source ID, destination ID, encryption parameters, and/or communication type).

In various implementations, the network security controller 130 performs intraflow pattern matching to determine whether an ongoing Wi-Fi calling/messaging session breaches the security criteria 132. For example, in some implementations, the network security controller 130 performs the intraflow pattern matching to determine whether an active IPSec session (e.g., the encrypted communication tunnel 162) is being used to transfer files instead of Wi-Fi calling/messaging. In some implementations, intraflow pattern refers to the one or more of the following characteristics of a flow: packet size, packet rate (e.g., inter-packet intervals), and/or average flow throughput (e.g., throughput measured in Kbps). In some implementations, the network security controller 130 checks the intraflow pattern for various different types of flow such as session initiation protocol (SIP) signaling and/or real-time streaming protocol (RTP) streams. In some implementations, for SIP signaling, the network security controller 130 collects and stores matching patterns for various SIP implementations used for carrier Wi-Fi calling/messaging. In some implementations, for RTP streams, the network security controller 130 collects and stores matching patterns as a reference for all common codecs.

Figure 2:
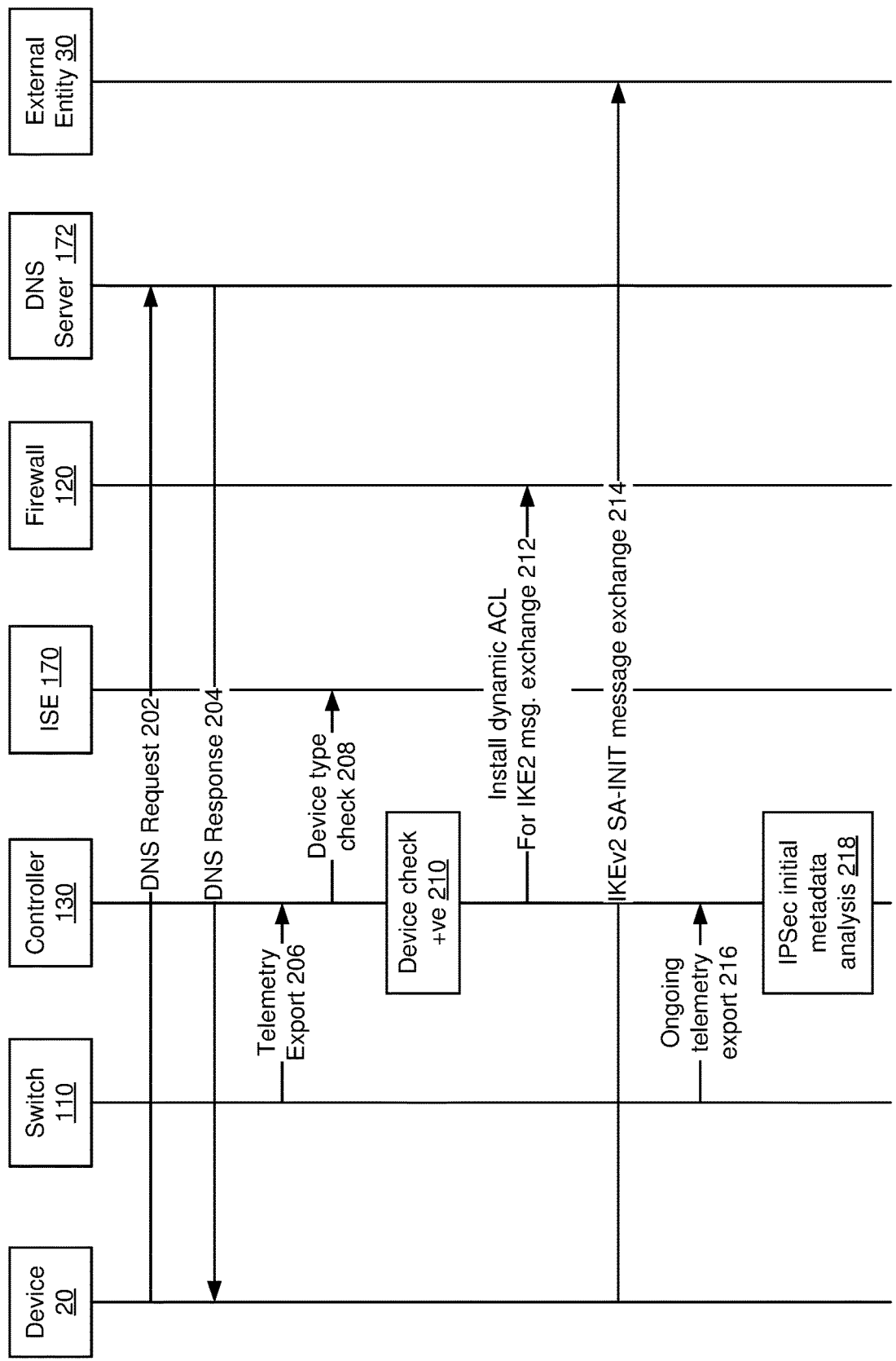
FIG. 2 is a sequence diagram in which a secure enterprise network allows calling/messaging in accordance with some implementations.

In various implementations, the enterprise network 100 (e.g., the network security controller 130) utilizes a two stage admission control process to determine whether to grant the request 22. FIG. 2 illustrates a sequence that corresponds to a first stage of the two stage admission control process, and FIGS. 3-4 illustrate sequences which correspond to a second stage of the two stage admission control process.

FIG. 2 illustrates a sequence diagram for an example admission control. In the example of FIG. 2, the admission control is utilized at a first stage of a two stage admission control process. In various implementations, during the first stage of admission control, the network security controller 130 performs a device type vulnerability check. For example, in some implementations, the network security controller 130 determines whether a model, a version and/or a serial number of the mobile device 20 are associated with any known security vulnerabilities. In some implementations, during the first stage of admission control, the network security controller 130 allows (e.g., only allows) IPSec IKEv2 messages. For example, in some implementations, during the first stage of admission control, the access control command 160 instructs the firewall 120 to open ports 500 and 4500 (e.g., via a dynamic Access Control List (ACL)), and allow (e.g., only allow) inbound and outbound IKEv2 messages for the mobile device 20. In some implementations, encrypted data packets are not allowed during the first stage of admission control, but are allowed during the second stage of admission control.

Referring to FIG. 2, at 202, the mobile device 20 sends a domain name system (DNS) request to a DNS server 172. In some implementations, the network security controller 130 determines whether the mobile device 20 made the DNS query for an FQDN which is on an approved list of FQDNs. At 204, the mobile device 20 receives a DNS response from the DNS server 172. At 206, the network security controller 130 receives a telemetry export from the enterprise access switch 110. In some implementations, the telemetry export includes network flow data, intraflow data and/or metadata. At 208, the network security controller 130 performs a device type check against an Identity Service Engine 170 that includes information on security vulnerabilities associated with various device types. At 210, the network security controller 130 determines that the device type check did not yield any security vulnerabilities associated with the mobile device 20. At 212, the network security controller 130 installs a dynamic ACL to allow IKEv2 messages to be exchanged. At 214, the mobile device 20 sends an IKEv2 message to the external entity 30. At 216, the network security controller 130 receives an ongoing telemetry export (e.g., intraflow data, for example, the ongoing flow data 164 shown in FIG. 1B) from the enterprise access switch 110. At 218, the network security controller 130 analyzes IPSec metadata (e.g., to ensure compliance with the security criteria 132 shown in FIGS. 1A-1B).

Figure 3:
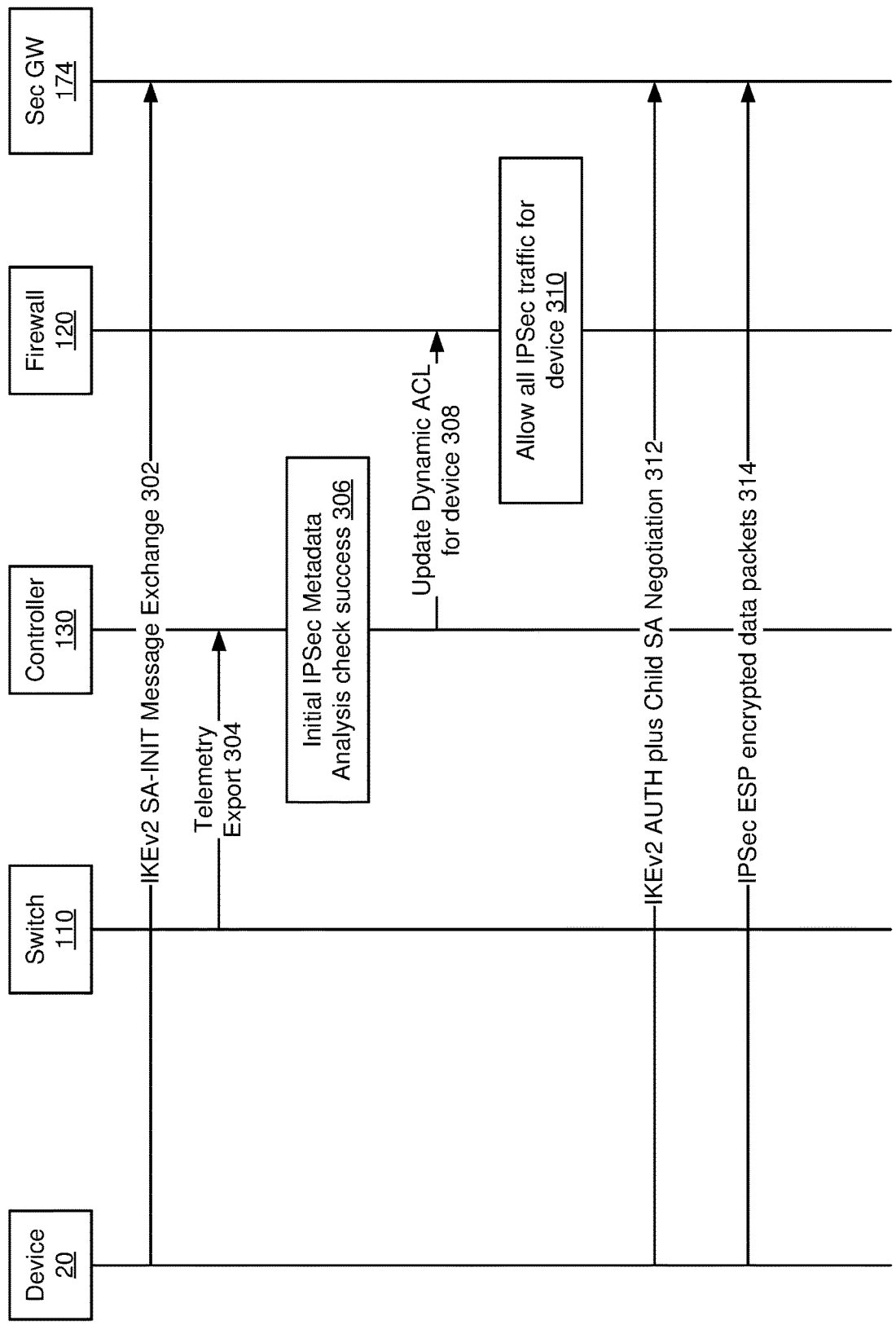
FIG. 3 is another sequence diagram in which the secure enterprise network allows calling/messaging in accordance with some implementations.
Figure 4:
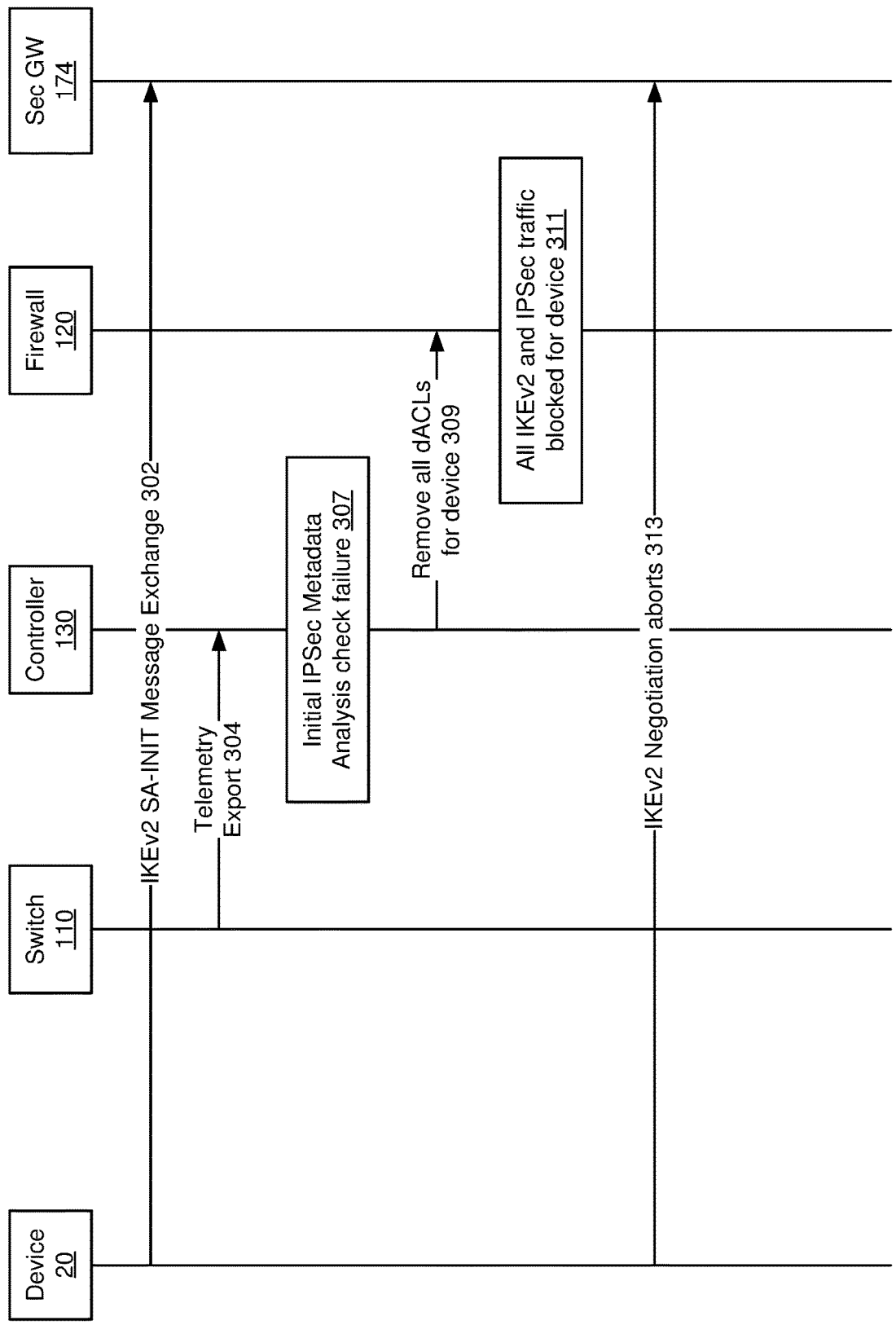
FIG. 4 is a sequence diagram in which the secure enterprise network denies calling/messaging in accordance with some implementations.

FIGS. 3 and 4 illustrate sequence diagrams for an example admission control. In the example of FIGS. 3 and 4, the admission control is utilized at a second stage of the two stage admission control process. FIG. 3 illustrates a successful use case for the second stage, whereas FIG. 4 illustrates a failured use case for the second stage. In some implementations, the second stage is followed by first stage (e.g., by the initial IPSec metadata analysis). In some implementations, a successful second stage admission control results in the network security controller 130 updating the ACL to allow both IKEv2 and AH or ESP encrypted data packets. In some implementations, a failed second stage admission control results in the network security controller 130 removing (e.g., revoking) the ACL rules and causes the abortion of IKEv2 negotiation. A person of ordinary skill in the art will appreciate that the example two-stage admission control process can be combined into a one stage admission control process, or split into a multi-stage admission control process with more than two stages.

Referring to FIG. 3, at 302, the mobile device 20 sends a IKEv2 message to a security gateway 174 (e.g., the external entity 30). At, 304, the network security controller 130 receives a telemetry export (e.g., network flow data) from the enterprise access switch 110. At 306, the network security controller 130 determines that the initial IPSec metadata analysis check was successful. At 308, the network security controller 130 updates the dynamic ACL for the mobile device 20 (e.g., by transmitting the access control command 160 or the updated access control command 160*a* to the firewall 120). At 310, the firewall 120 allows all IPSec traffic for the mobile device 20. At 312, an IKEv2 authorization negotiation takes place between the mobile device 20 and the security gateway 174. At 314, ESP encrypted data packets flow between the mobile device 20 and the security gateway 174.

Referring to FIG. 4, at 307, the network security controller 130 determines that the initial IPSec metadata analysis check failed. At 309, the network security controller 130 removes all dynamic ACLs (dACLs) for the mobile device 20. At 311, the firewall 120 blocks all IKEv2 and IPSec traffic for the mobile device 20. At 313, the IKEv2 negotiation aborts.

Figure 5:
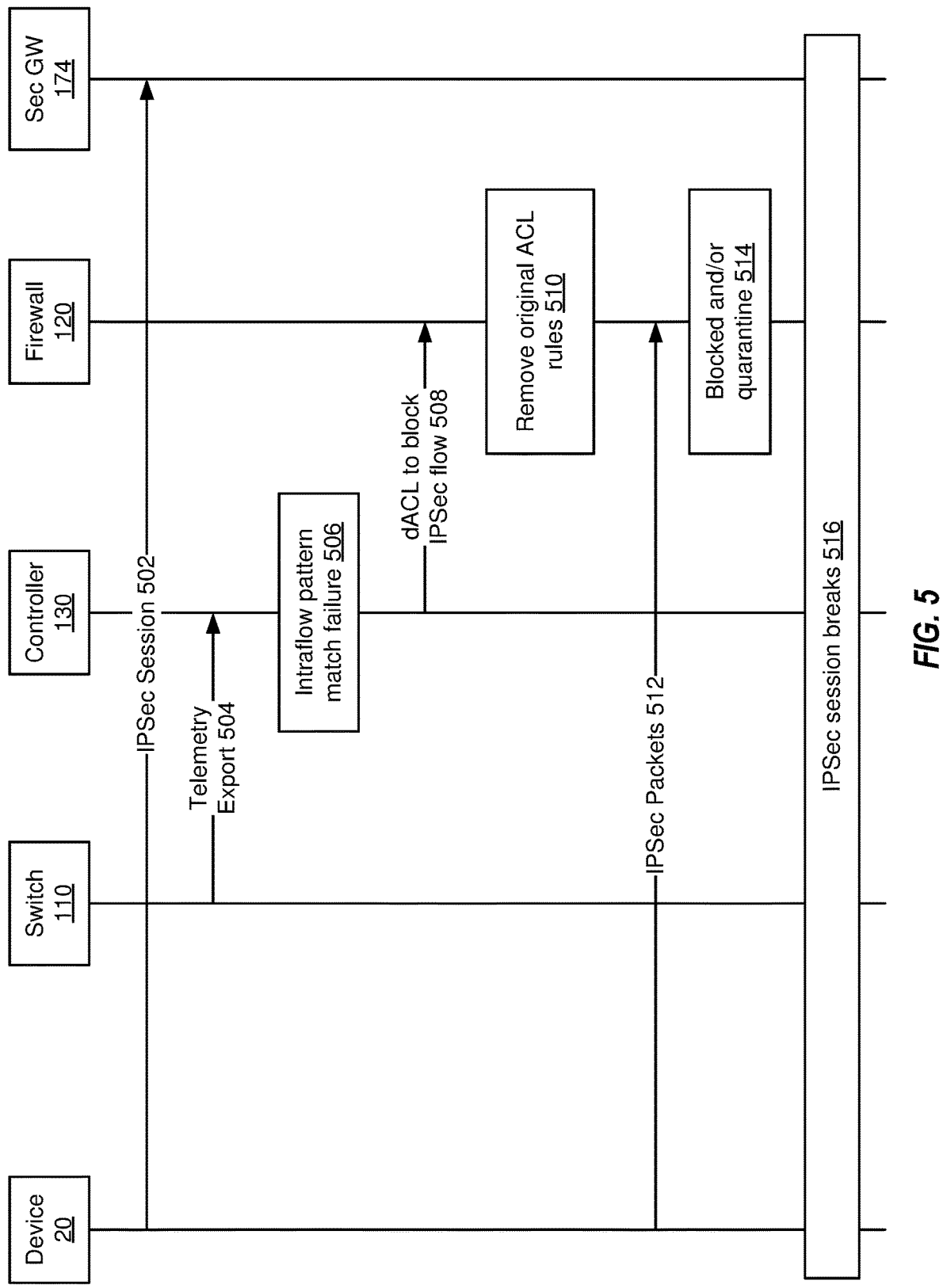
FIG. 5 is a sequence diagram in which the secure enterprise network monitors ongoing calls/messages in accordance with some implementations.

FIG. 5 illustrates a sequence diagram for an example intraflow pattern check. In the example of FIG. 5, the intraflow pattern check results in a failure. As such, in some implementations, the IPsec session is terminated after the intraflow pattern check results in a failure. At 502, the network security controller 130 establishes an IPSec session between the mobile device 20 and the security gateway 174 (e.g., the network security controller 130 establishes the encrypted communication tunnel 162 shown in FIG. 1B). At 504, the network security controller 130 receives a telemetry export from the enterprise access switch 110 (e.g., the network security controller 130 receives the ongoing flow data 164 shown in FIG. 1B). At 506, the network security controller 130 determines that there is an intraflow pattern match failure. For example, the network security controller 130 determines that the intraflow pattern does not match predefined patterns for Wi-Fi calling/messaging. At 508, the network security controller 130 instructs the firewall 120 to block the IPSec flow for the mobile device 20 (e.g., by removing the dACL for the mobile device 20). At 510, the firewall 120 removes the original ACL rules. For example, the firewall 120 closes the ports that were being utilized by the mobile device 20. At 512, the mobile device 20 sends IPSec packets to the firewall 120. At 514, the firewall 120 blocks the IPSec packets sent by the mobile device 20. In some implementations, the enterprise network 100 quarantines the mobile device 20. At 516, the IPSec session terminates.

In various implementations, the methods, devices and/or systems described herein utilize traffic flow analysis and/or IPSec metadata to identify anomalies.

Figure 6:
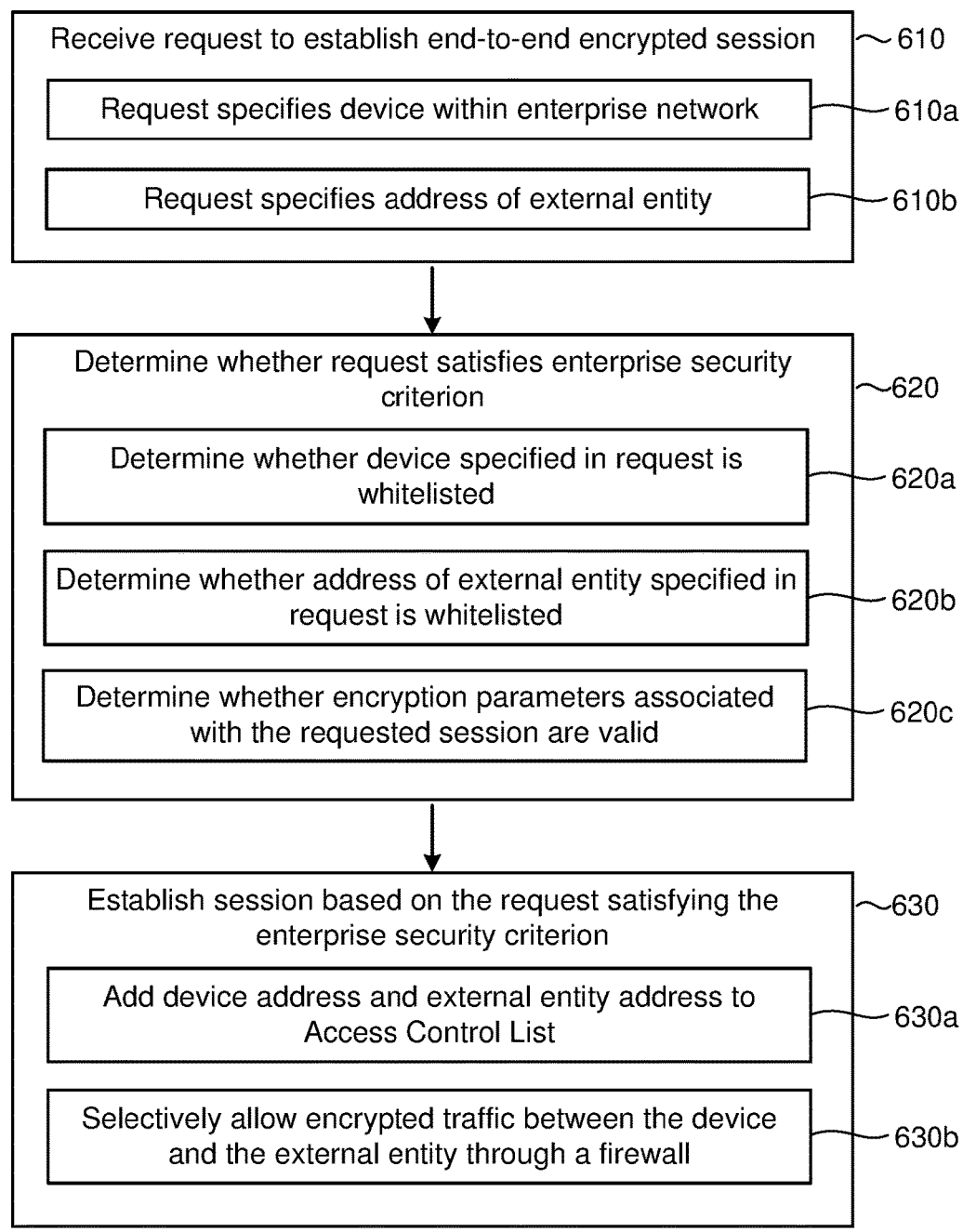
FIG. 6 is a flowchart representation of a method of establishing a communication session for calling/messaging in accordance with some implementations.

FIG. 6 is a flowchart representation of a method 600 of establishing a communication session for Wi-Fi calling/messaging in accordance with some implementations. In various implementations, the method 600 is implemented as a set of computer readable instructions that are executed at a network node within an enterprise network (e.g., the network security controller 130 shown in FIGS. 1A-5). Briefly, the method 600 includes receiving a request to establish an end-to-end encrypted session (at 610), determining whether the request satisfies an enterprise security criterion (at 620), and establishing the end-to-end encrypted session based on the request satisfying the enterprise security criterion (at 630).

As represented by block 610, in various implementations, the method 600 includes receiving a request (e.g., the request 22 shown in FIG. 1A) to establish an end-to-end encrypted session (e.g., an IPSec session). As represented by block 610*a*, in some implementations, the request specifies a particular device within the enterprise network (e.g., the request includes the source ID 24 shown in FIG. 1A). As represented by block 610*b*, in some implementations, the request specifies an address of an external entity that is outside the enterprise network (e.g., the request includes a FQDN, an IP address, etc., for example, the request includes destination ID 26 shown in FIG. 1A).

As represented by block 620, in various implementations, the method 600 includes determining whether the request satisfies an enterprise security criterion (e.g., the security criteria 132 shown in FIGS. 1A-1B). As represented by block 620*a*, in some implementations, the method 600 includes determining whether the device specified in the request is whitelisted (e.g., determining whether the device is among the trusted sources 134 shown in FIG. 1A). For example, determining whether the device specified in the request is whitelisted includes determining whether the device has Wi-Fi calling capability. As represented by block 620*b*, in some implementations, the method 600 includes determining whether the address of the external entity specified in the request is whitelisted (e.g., determining whether the external entity is among the trusted destinations 136 shown in FIG. 1A). For example, determining whether the address of the external entity specified in the request is whitelisted includes determining whether the FQDN specified in the request is associated with a recognized mobile network operator that provides cellular coverage to enterprise devices. As represented by block 620*c*, in some implementations, the method 600 includes determining whether encryption parameters associated with the requested session are valid (e.g., determining whether the communication parameters 28 are from the set of predefined communication parameters 138). For example, the method 600 includes checking the Diffi-Helman group, the initial cryptographic algorithms, etc.

As represented by block 630, in various implementations, the method 600 includes establishing or triggering establishment of the requested session in response to the request satisfying the enterprise security criterion (e.g., establishing the encrypted communication tunnel 162 shown in FIG. 1B). As represented by block 630*a*, in some implementations, the method 600 includes adding the device address and the external entity address to an Access Control List (ACL). As represented by block 630*b*, in various implementations, the method 600 includes selectively allowing encrypted traffic between the device and the external entity through a firewall (e.g., by opening ports 500 and 4500, and allowing inbound/outbound IKEv2 messages between the specified device and the specified external entity).

Figure 7:
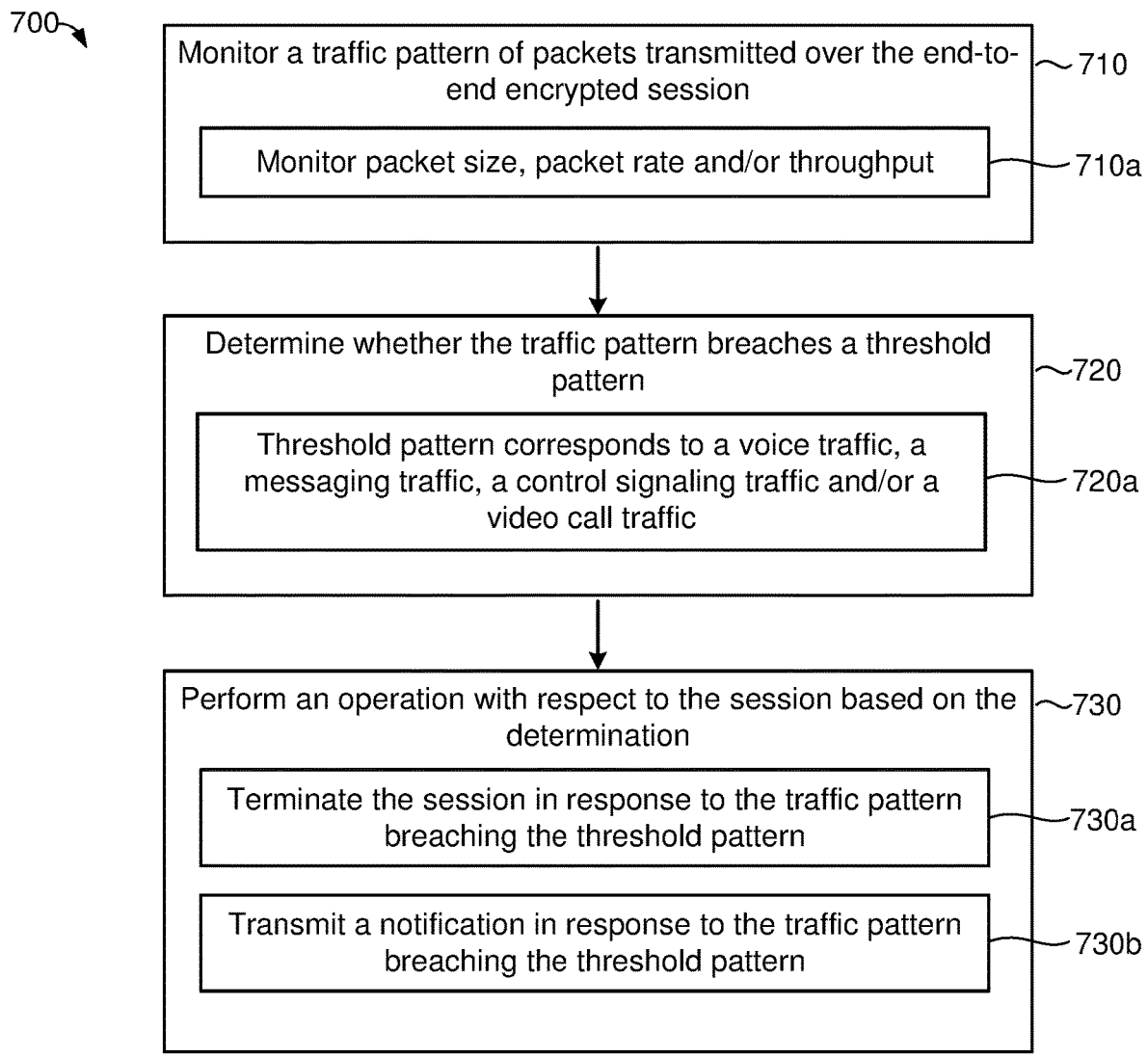
FIG. 7 is a flowchart representation of a method of monitoring ongoing calls/messages in accordance with some implementations.

FIG. 7 is a flowchart representation of a method 700 of monitoring an established session (e.g., an active IPSec session, for example, the encrypted communication tunnel 162 shown in FIG. 1B). In various implementations, the method 700 is implemented as a set of computer readable instructions that are executed at a node within an enterprise network (e.g., the network security controller 130 shown in FIG. 1A). Briefly, the method 700 includes monitoring a traffic pattern of packets transmitted over the session (at 710), determining whether the traffic pattern breaches (e.g., satisfies) a threshold pattern (at 720), and performing an operation with respect to the session based on the determination (at 730).

As represented by block 710, in various implementations, the method 700 includes monitoring a traffic pattern of packets transmitted over the end-to-end encrypted session (e.g., based on the ongoing flow data 164 shown in FIG. 1B). As represented by block 710*a*, in some implementations, the method 700 includes monitoring packet size, packet rate and/or throughput of packets being transmitted over the end-to-end encrypted session.

As represented by block 720, in various implementations, the method 700 includes determining whether the traffic pattern breaches a threshold pattern (e.g., an IPSec vulnerability signature, for example, a predefined intraflow pattern for Wi-Fi calling/messaging specified by the security criteria 132). As represented by block 720a, in some implementations, the threshold pattern corresponds to voice traffic, messaging traffic, control signaling traffic and/or video call traffic.

As represented by block 730, in various implementations, the method 700 includes performing an operation with respect to the session. As represented by block 730a, in some implementations, the method 700 includes terminating the session in response to the traffic pattern breaching the threshold pattern (e.g., by transmitting the updated access control command 160a shown in FIG. 1B). As represented by block 730b, in some implementations, the method 700 includes transmitting a notification in response to the traffic pattern breaching the threshold pattern.

Figure 8:
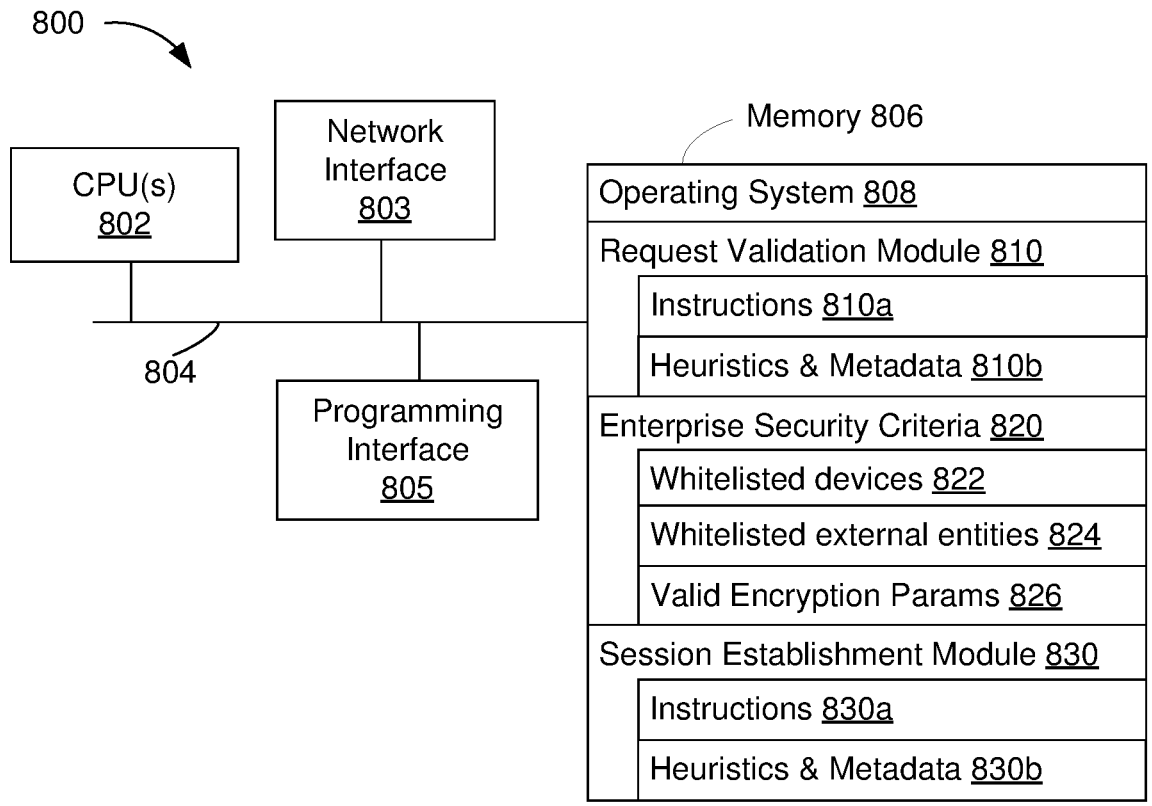
FIG. 8 is a block diagram of a server system enabled with various modules that are provided to establish/monitor calls/messages over secure enterprise networks in accordance with some implementations.

FIG. 8 is a block diagram of a server system 800 enabled with one or more components of a network node (e.g., the network security controller 130 shown in FIGS. 1A-1B) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 800 includes one or more processing units (CPUs) 802, a network interface 803, a programming interface 805, a memory 806, and one or more communication buses 804 for interconnecting these and various other components.

In some implementations, the network interface 803 is provided to, among other uses, establish and maintain a metadata tunnel between a cloud hosted network management system and at least one private network including one or more compliant devices. In some implementations, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium.

In some implementations, the memory 806 or the non-transitory computer readable storage medium of the memory 806 stores the following programs, modules and data structures, or a subset thereof including an optional operating system 808, a request validation module 810, enterprise security criteria 820 and a session establishment module 830. In some implementations, the request validation module 810 receives and validates a request to establish an end-to-end encrypted session between a device within an enterprise network and an external entity that is outside the enterprise network. To that end, the request validation module 810 includes instructions 810a, and heuristics and metadata 810b. In some implementations, the enterprise security criteria 820 includes a list of whitelisted devices 822 (e.g., devices that are capable of and/or allowed to perform Wi-Fi calling, for example, the trusted sources 134 shown in FIG. 1B), a list of whitelisted external entities 824 (e.g., a list of approved FQDNs, for example, the trusted destinations 136 shown in FIG. 1B), and valid encryption parameters 826 (e.g., permissible values for a transform set such as permissible cryptographic algorithms and/or permissible Diffi-Helman values, for example, the predefined communication parameters 138 shown in FIG. 1B). In some implementations, the session establishment module 830 establishes or triggers the establishment of an end-to-end encrypted session (e.g., encrypted communication tunnel 162 shown in FIG. 1B) between the device within the enterprise network and the external entity. To that end, the session establishment module 830 includes instructions 830a, and heuristics and metadata 830b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a network node configured to connect within an enterprise network, the network node including a non-transitory memory and one or more processors coupled with the non-transitory memory:
allowing an Internet Key Exchange (IKE) request for establishing an end-to-end encrypted session to be communicated between a device in the enterprise network and a gateway that is outside the enterprise network, the IKE request being communicated from the device via an access switch of the enterprise network and to the gateway via a firewall of the enterprise network;
receiving, from the access switch, network flow data identified from a message exchange between the device and the gateway for establishing the end-to-end encrypted session based on the IKE request;
determining, based on the network flow data, whether an enterprise security criterion for establishing the end-to-end encryption session is satisfied; and
sending a command to the firewall to grant establishing of the end-to-end encrypted session based the enterprise security criterion being satisfied or to deny establishing of the end-to-end encrypted session based on the enterprise security criterion not being satisfied, wherein the end-to-end encrypted session utilizes an Internet Protocol Security (IPsec) tunnel for encrypted packets to be transmitted between the device and the gateway.

2. The method of claim 1, wherein determining whether the enterprise security criterion for establishing the end-to-end encryption session is satisfied includes determining whether a device identifier (ID) associated with the device is included in a list of device IDs that correspond to devices that are allowed to establish end-to-end encrypted sessions with external entities.

3. The method of claim 1, wherein determining whether the enterprise security criterion for establishing the end-to-end encryption session is satisfied includes determining whether a destination address associated with the IKE request is included in a list of destination addresses that the device is permitted to communicate with.

4. The method of claim 1, wherein determining whether the enterprise security criterion for establishing the end-to-end encryption session is satisfied includes determining whether an encryption parameter associated with the IKE request is valid.

5. The method of claim 1, wherein sending the command to grant or to deny the establishing of the end-to-end encrypted session comprises sending an access control command for an access control list at the firewall.

6. The method of claim 1, further comprising:
monitoring a traffic pattern of packets transmitted over the end-to-end encrypted session, the traffic pattern being associated with one or more of a packet size, a packet rate and a throughput;
determining whether the traffic pattern breaches a threshold pattern corresponding to one or more of a voice traffic, a messaging traffic, a control signaling traffic and a video call traffic; and
terminating the end-to-end encrypted session based on the traffic pattern in relation to the threshold pattern.

7. The method of claim 1, wherein the access switch comprises an access point (AP).

8. The method of claim 1, wherein the network node is configured to connect within the enterprise network comprising a Wi-Fi network, the end-to-end encrypted session is for a Wi-Fi call from the device, and the gateway comprises a security gateway configured to connect to a cellular network for the Wi-Fi call.

9. An electronic device, comprising:
one or more processors; and
a non-transitory memory including instructions that, when executed by the one or more processors, cause the electronic device when connected within an enterprise network to:
allow an Internet Key Exchange (IKE) request for establishing an end-to-end encrypted session to be communicated between a device in the enterprise network and a gateway that is outside the enterprise network, the IKE request being communicated from the device via an access switch of the enterprise network and to the gateway via a firewall of the enterprise network;
receive, from the access switch, network flow data identified from a message exchange between the device and the gateway for establishing the end-to-end encrypted session based on the IKE request;
determine, based on the network flow data, whether an enterprise security criterion for establishing the end-to-end encryption session is satisfied; and
send a command to the firewall to grant establishing of the end-to-end encrypted session based on the enterprise security criterion being satisfied or to deny establishing of the end-to-end encrypted session based on the enterprise security criterion not being satisfied, wherein the end-to-end encrypted session utilizes an Internet Protocol Security (IPsec) tunnel for encrypted packets to be transmitted between the device and the gateway.

10. The electronic device of claim 9, wherein determining whether the enterprise security criterion is satisfied includes determining whether a device identifier (ID) associated with the device is included in a list of device IDs that correspond to devices that are allowed to establish end-to-end encrypted sessions with external entities.

11. The electronic device of claim 9, wherein determining whether the enterprise security criterion is satisfied includes determining whether a destination address associated with the IKE request is included in a list of destination addresses that the device is permitted to communicate with.

12. The electronic device of claim 9, wherein determining whether the enterprise security criterion is satisfied includes determining whether an encryption parameter associated with the IKE request is valid.

13. The electronic device of claim 9, wherein to send the command to grant or to deny the establishing of the end-to-end encrypted session comprises sending an access control command for an access control list at the firewall.

14. The electronic device of claim 9, wherein the instructions further cause the electronic device to:
monitor a traffic pattern of packets transmitted over the end-to-end encrypted session, the traffic pattern being associated with one or more of a packet size, a packet rate and a throughput;
determine whether the traffic pattern breaches a threshold pattern corresponding to one or more of a voice traffic, a messaging traffic, a control signaling traffic and a video call traffic; and terminate the end-to-end encrypted session based on the traffic pattern in relation to the threshold pattern.

15. The electronic device of claim 9, wherein the access switch comprises an access point (AP).

16. The electronic device of claim 9, which comprises a network security controller configured to connect within the enterprise network comprising a Wi-Fi network, and wherein the end-to-end encrypted session is for a Wi-Fi call from the device and the gateway comprises a security gateway configured to connect to a cellular network for the Wi-Fi call.

17. A non-transitory computer readable storage medium storing one or more programs, the one or more programs comprising instructions that, when executed by an electronic device connected within an enterprise network, cause the electronic device to:
  allow an Internet Key Exchange (IKE) request for establishing an end-to-end encrypted session to be communicated between a device in the enterprise network and a gateway that is outside the enterprise network, the IKE request being communicated from the device via an access switch of the enterprise network and to the gateway via a firewall of the enterprise network;
  receive, from the access switch, network flow data identified from a message exchange between the device and the gateway for establishing the end-to-end encrypted session based on the IKE request;
  determine, based on the network flow data, whether an enterprise security criterion for establishing the end-to-end encryption session is satisfied; and
  send a command to the firewall to grant establishing of the end-to-end encrypted session based on the enterprise security criterion being satisfied or to deny establishing of the end-to-end encrypted session based on the enterprise security criterion not being satisfied, wherein the end-to-end encrypted session utilizes an Internet Protocol Security (IPsec) tunnel for encrypted packets to be transmitted between the device and the gateway.

18. The non-transitory computer readable storage medium of claim 17, wherein determining whether the enterprise security criterion is satisfied includes determining whether a device identifier (ID) associated with the device is included in a list of device IDs that correspond to devices that are allowed to establish end-to-end encrypted sessions with external entities.

19. The non-transitory computer readable storage medium of claim 17, wherein determining whether the enterprise security criterion is satisfied includes determining whether a destination address associated with the IKE request is included in a list of destination addresses that the device is permitted to communicate with.

20. The non-transitory computer readable storage medium of claim 17, wherein determining whether the enterprise security criterion is satisfied includes determining whether an encryption parameter associated with the IKE request is valid.

* * * * *